(No Model.)  2 Sheets—Sheet 1.

S. H. SHIPMAN.
SULKY PLOW.

No. 511,168.  Patented Dec. 19, 1893.

Witnesses:
Harry L. Amer.
W. S. Duvall.

Inventor:
Samuel H. Shipman.

By his Attorneys,
C. A. Snow & Co.

THE NATIONAL LITHOGRAPHING COMPANY,
WASHINGTON, D. C.

(No Model.) 2 Sheets—Sheet 2.

S. H. SHIPMAN.
SULKY PLOW.

No. 511,168. Patented Dec. 19, 1893.

Witnesses:
Harry L. Amer.
W. S. Duvall.

Inventor:
Samuel H. Shipman.
By his Attorneys,
C. A. Snow & Co.

UNITED STATES PATENT OFFICE.

SAMUEL H. SHIPMAN, OF WAXAHACHIE, TEXAS.

SULKY-PLOW.

SPECIFICATION forming part of Letters Patent No. 511,168, dated December 19, 1893.

Application filed August 12, 1893. Serial No. 482,998. (No model.)

*To all whom it may concern:*

Be it known that I, SAMUEL H. SHIPMAN, a citizen of the United States, residing at Waxahachie, in the county of Ellis and State of Texas, have invented a new and useful Sulky-Plow, of which the following is a specification.

My invention relates to improvements in plows, and to that particular class thereof known as sulky-plows.

The objects of the invention are to construct a plow of cheap, simple, and durable construction that will avoid the collection of trash, weeds, grass, &c., and thereby will not clog; that is designed to run upon the unplowed ground and therefore retain the plow in a steady position; to provide an improved adjusting means for plows whereby the same may be set to run shallow or deep; and to adapt the plow for successfully operating upon hillsides or rolling ground.

With these and other objects in view the invention consists in certain features of construction hereinafter specified and particularly pointed out in the claims.

Figure 1:
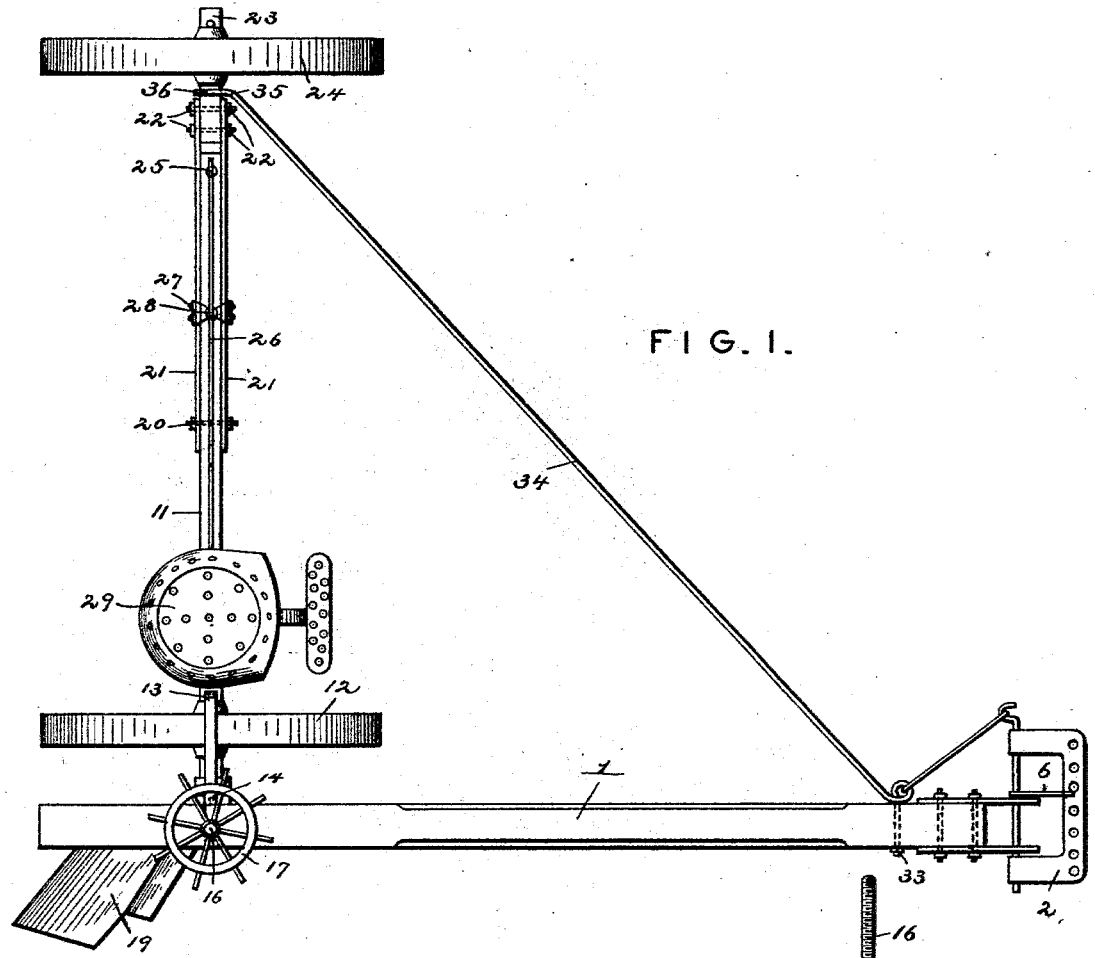
Figure 2:
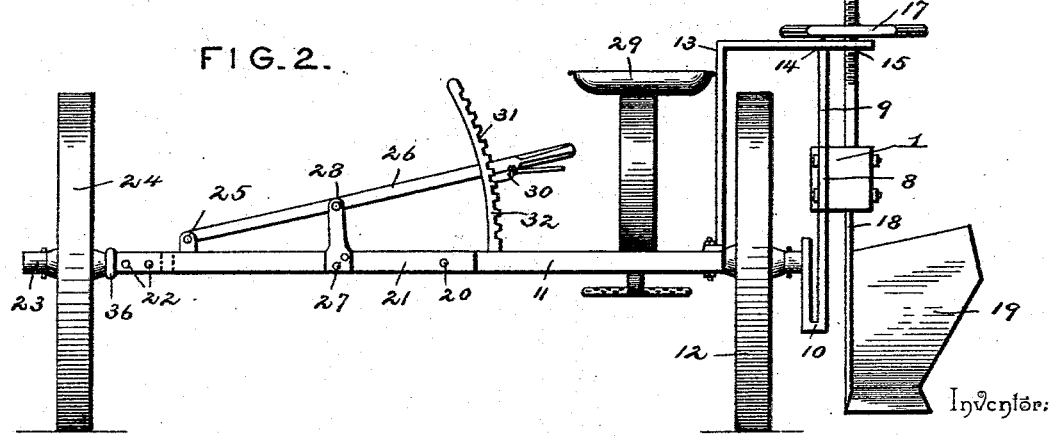
Figure 3:
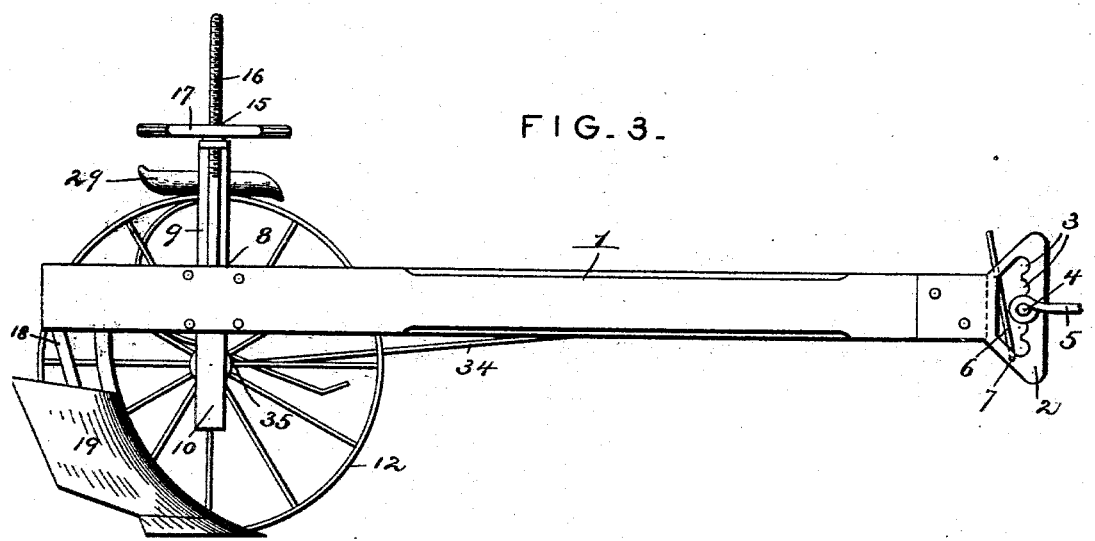
Figure 4:
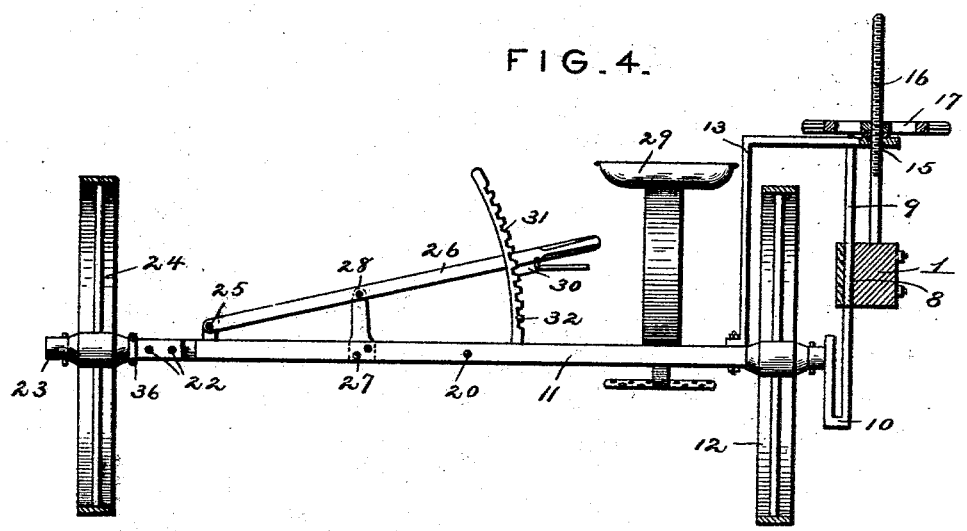

Referring to the drawings:—Figure 1 is a plan view of a plow constructed in accordance with my invention. Fig. 2 is a rear elevation thereof. Fig. 3 is a side elevation. Fig. 4 is a transverse sectional view.

Like numerals of reference indicate like parts in all the figures of the drawings.

In the construction of my plow I employ a beam 1, providing the same at its outer end with any desired clevis. In the present instance, however, I have shown one particular form of clevis that I deem desirable and as forming a part of my invention. This clevis I have indicated by the numeral 2, and the same is provided with a vertical series of transverse half-round notches 3 in which a draft-bolt 4 may be located and connected to a draft-rod 5. A spring-tongue 6 is secured at its lower end as at 7 to the clevis and bears against the rear side of the bar 5, therefore retaining the bolt 4 in the notch in which it may be placed. I employ this spring-tongue in that I am enabled to secure a quick adjustment without removing the nut of the bolt. By the employment of the spring-tongue it is simply necessary to draw the same backward at its free end and raise and lower the bolt or draft-bar, replacing the bolt in any one of the notches and releasing the spring-tongue, by which means the said bolt is retained in position. This operation may be performed with dispatch and facility, which are desirable features in a plow, and thus the point of the plow raised and lowered and the plow as a whole made to run the desired depth.

A keeper 8 is bolted to one side of the plow-beam near its rear end, and mounted loosely in said keeper is the outer vertical portion 9 of a substantially U-shaped standard 10, the inner shorter branch of the standard being rigidly secured to the end of the main axle 11. This axle carries a ground-wheel 12, which is located at the inner side of the aforesaid standard 10. Bolted to the upper side of the axle at the opposite side of the wheel 12 is an inverted L-shaped standard 13, whose upper horizontal portion projects beyond the outer terminal of the U-shaped standard, is bolted thereto, as indicated at 14, and projecting therebeyond is provided with a threaded opening 15. A screw-threaded rod 16 is located in the threaded perforation 15 and connected at its lower end to the beam 1, and above said opening 15 the said rod has mounted thereon a threaded hand-wheel 17, and by a manipulation of the same it will be obvious that the beam 1 may be raised and lowered.

The beam 1 of course carries the plow-standards 18, to which is secured the plow 19 which may be of any desired construction.

Pivoted as at 20 to the opposite sides of the main axle 11 is a pair of splint-bars 21 whose ends project beyond the outer end of the axle and are rigidly bolted as at 22 to a short auxiliary axle 23 upon which the ground-wheel 24 is mounted for rotation. A bearing-ear 25 is located upon the outer end of the main axle between the splint-bars and has pivoted thereto the outer end of a hand-lever 26 whose intermediate portion is fulcrumed on a standard 27, as indicated at 28, the said standard rising from the splint-bars. The inner end of the lever is shaped to form a suitable handle and terminates in reach of the driver when perched upon the seat 29 provided for his accommodation, and at its inner end the said lever is provided with a reciprocating locking bolt or pawl 30 which moves over and is designed to engage with any one of a series of notches or teeth 31 formed in a curved locking standard 32 that rises from the axle 11.

An eye-bolt 33 passes through the axle 1 in rear of the clevis and also through the front end of a diagonal brace-rod 34 whose rear end is connected as at 35 to a cuff or clip 36 that embraces the short or auxiliary axle 23.

From the foregoing description in connection with the accompanying drawings it will be seen that I have provided a plow of cheap and simple construction, which is light of draft by reason of the fact that its ground-wheels travel upon the unplowed ground, and which is not liable to become clogged by weeds, &c., and furthermore, that without stopping the plow the driver may grasp the hand-lever 26 and so operate the same as to raise and lower one side of the plow and thus adapt the same to operate upon the sides of hills in the manner apparent. Through the medium of the hand-wheels 17 the plow proper may be raised and lowered into and out of the ground.

I do not limit my invention to the precise details of construction herein shown and described, but hold that I may vary the same to any degree and extent within the knowledge of the skilled mechanic.

Having described my invention, what I claim is—

1. In a plow of the class described, the combination with a main axle, a plow-beam secured to one end of the same, and a wheel upon the axle, of a pair of splint-bars pivoted to the main axle and projecting beyond the outer end thereof, an auxiliary axle clamped between the splint-bars, a ground-wheel arranged on the latter axle, a fulcrum-standard arranged on the splint-bars, a hand-lever fulcrumed on the standard and loosely connected at its outer end to the main axle, a pawl carried by the lever, and a notched locking-standard arranged on the axle, substantially as specified.

2. In a plow, the combination with the beam carrying the plow, a standard connected loosely with the beam, an axle secured to the lower end of the standard, ground-wheels for the axle, and an inverted L-shaped standard mounted on the axle, extending over the wheel and secured to and projecting beyond that standard connected to the beam, a threaded shaft arranged in an eye formed in the outer end of the inverted L-shaped standard, a threaded hand-wheel arranged on the shaft, said shaft being secured at its lower end to the beam, substantially as specified.

3. In a plow, the combination with a plow-carrying beam having a keeper at its inner side near its rear end, a U-shaped standard 10 having its outer branch loosely mounted in the keeper, an axle secured rigidly to the inner branch of the keeper below the beam, ground-wheels arranged on the axle, the inverted L-shaped standard arranged on the axle, overlapping the upper end of the standard 10, bolted thereto, and having a threaded opening near its outer end, the threaded shaft secured to the beam and projecting through the threaded opening, and the threaded hand-wheel arranged upon the shaft, substantially as specified.

4. The axle, the combination with the standards rising therefrom at one end and connected together, the beam mounted to slide vertically on one of the standards, a threaded vertical rod extending from the beam, and a hand-wheel, substantially as specified.

5. The main axle 11 carrying the plow beam and wheel 12, combined with the splint bars 21 pivoted to the opposite sides of the main axle, the auxiliary axle 23 carrying the wheel 24 and rigidly secured to and between the projecting ends of the splint bars, and mechanism mounted on the main axle and connected to the splint bars for adjusting the auxiliary axle relative to the main axle, substantially as specified.

6. The main axle 11 carrying the plow beam and wheel 12, combined with the splint bars 21 pivoted to the opposite sides of the main axle, the auxiliary axle 23 carrying the wheel 24 and rigidly secured to and between the projecting ends of the splint bars, and mechanism mounted on the main axle and connected to the splint bars for adjusting the auxiliary axle relative to the main axle, and the diagonal brace rod 34 mounted on the auxiliary axle and connected at its outer end to the front end of the beam, substantially as specified.

7. The axle having the wheel 12 and the vertical standard 10 connected to the axle outside the wheel, the beam 1 mounted to slide vertically on the standard, a standard 13 rising from the axle and connected to and supporting the upper end of the standard 10, and mechanism for raising and lowering the beam 1, substantially as specified.

In testimony that I claim the foregoing as my own I have hereto affixed my signature in the presence of two witnesses.

SAMUEL H. SHIPMAN.

Witnesses:
 H. P. MIZELL,
 A. LASSWELL.